July 30, 1946.
F. E. MICHAEL
2,405,094
TWIN FEED GRAIN BLOWER
Filed July 14, 1945
2 Sheets—Sheet 1
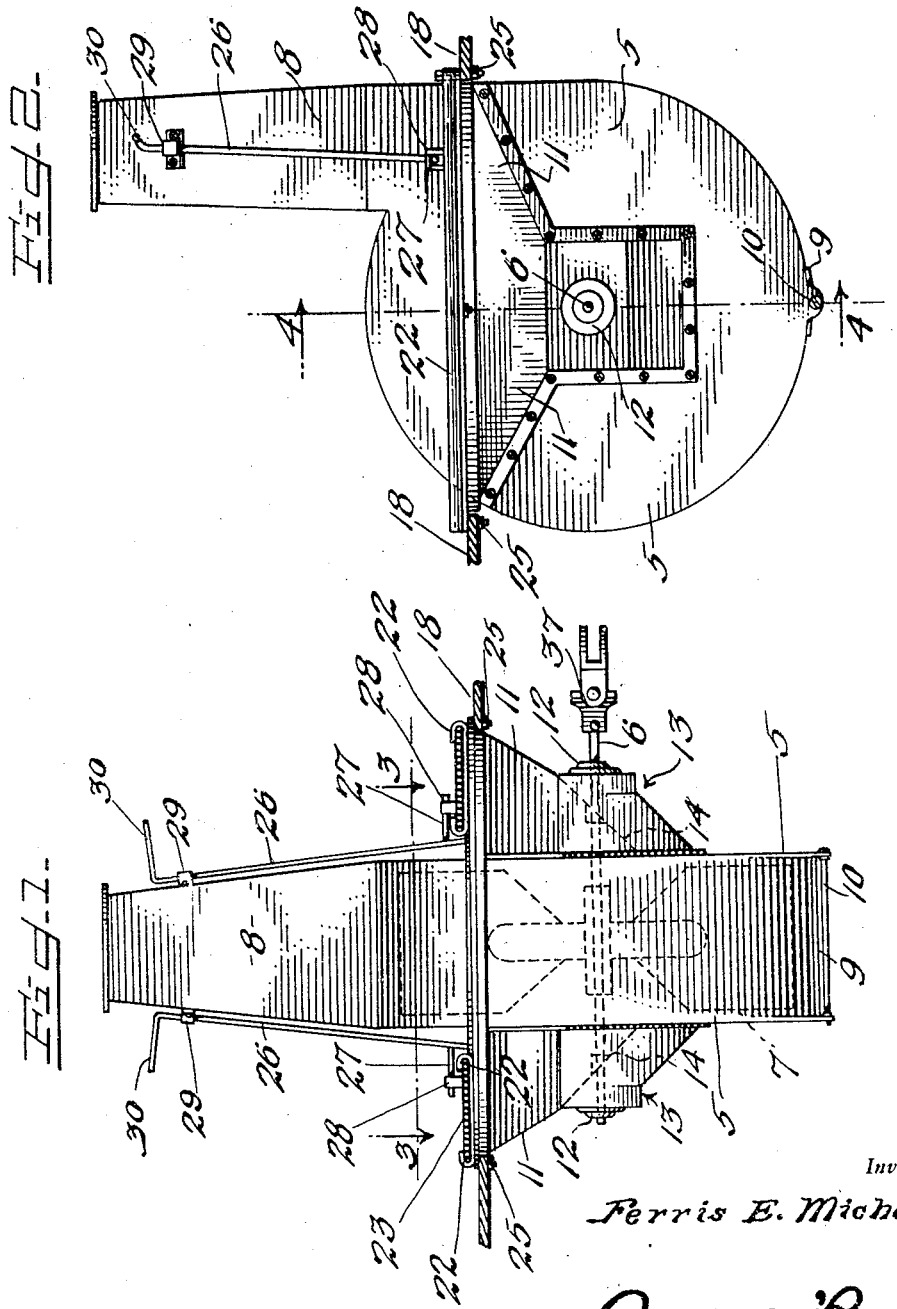
Inventor
*Ferris E. Michael*
By *Clarence A. O'Brien and Harvey B. Jackson*
Attorneys

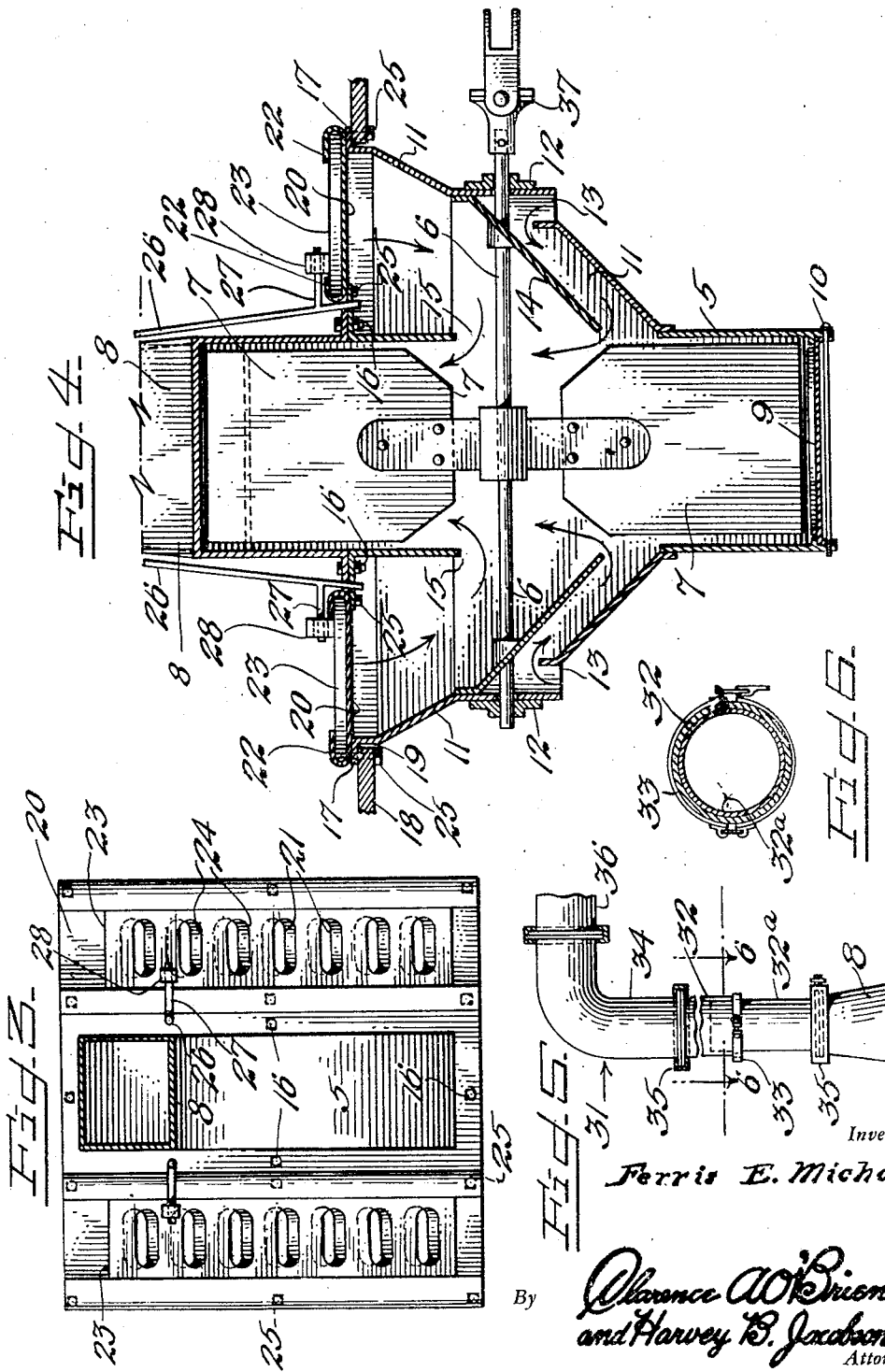

Patented July 30, 1946

2,405,094

UNITED STATES PATENT OFFICE 2,405,094

TWIN FEED GRAIN BLOWER

Ferris E. Michael, Rozel, Kans.

Application July 14, 1945, Serial No. 605,033

6 Claims. (Cl. 214—83)

This invention relates to twin feed grain blowers, and has more particular reference to a blower adapted for installation in an opening provided in the floor of a truck body and by means of which grain may be readily and expeditiously unloaded from the truck body.

An object of the present invention is to provide a device of the above kind which embraces the desired qualities of simplicity, durability and efficiency in operation.

A further object of the invention is to provide a blower by means of which an ordinary motor truck may be equipped for the unloading of grain therefrom in a convenient and expeditious manner.

The specific nature of the present invention, as well as more specific objects and features thereof, will become apparent from the following description when considered in connection with the accompanying drawings.

The invention consists in the novel form, combination and arrangement of parts hereinafter more fully described, shown in the drawings and claimed.

In the drawings, wherein like reference characters indicate corresponding parts throughout the several views:

Figure 1 is a front elevational view of a grain blower constructed in accordance with the present invention.

Figure 2 is a side elevational view thereof.

Figure 3 is a horizontal section taken substantially on line 3—3 of Figure 1.

Figure 4 is an enlarged fragmentary vertical transverse sectional view taken on line 4—4 of Figure 2.

Figure 5 is a fragmentary side elevational view, partly broken away and drawn on a reduced scale, showing a preferred manner of providing the grain outlet pipe of the blower with an extension to direct the grain to the desired point of delivery.

Figure 6 is an enlarged horizontal section taken on line 6—6 of Figure 5.

Referring in detail to the drawings, the present grain blower consists of a vertical circular casing 5 having an axial horizontal shaft 6 upon which is secured an ordinary bladed impeller 7 so as to be operable in the casing 5. The casing 5 has a tangential peripheral outlet pipe 8 that projects upwardly and preferably tapers smaller in an upward direction as shown. At the bottom, the casing 5 is provided with a clean-out opening provided with a removable closure 9 held in place by a removable transverse supporting bolt 10.

Similar grain feed hoppers 11 are formed on opposite sides of the casing 5, and the outer walls of these hoppers are provided with bearings 12 for shaft 6 and adjacent but below these bearings with downwardly facing air inlets 13. Secured in the lower portions of the hoppers 11 above the air inlets 13 are downwardly and inwardly inclined baffles that direct the grain from the hoppers and the air admitted through the inlets 13 downwardly and inwardly to the side inlet openings 15 of the casing 5 near the center of the latter. The air and grain thus mix adjacent the hub of the impeller 7 and are discharged through the outlet pipe 8. Casing 5 is preferably composed of upper and lower sections separably bolted together, as at 16, and outwardly directed flanges 17 are provided at the tops of hoppers 11 and the lower section of casing 5, which flanges are adapted to rest upon and be bolted to the floor 18 of a truck body in surrounding relation to an opening 19 of suitable size and shape provided in the bottom of the truck body. The blower is thus rigidly installed in the bottom of the truck body with the lower section of casing 5 and hoppers 11 depending below the floor of the truck body, as illustrated in Figure 4. The tops of the hoppers 11 are thus disposed substantially flush with the bottom of the truck body, and the blower may be readily installed by simply setting it in the opening from above and then bolting it in place. By removing the upper section of the blower casing, access may be readily had to the interior of the blower for repairs or the like.

At the top, each hopper 11 is closed by a plate 20 having a longitudinal series of grain inlet openings or slots 21 therein and provided along opposite longitudinal or side edges with inturned flanges 22 forming guideways for a sliding closure plate 23 that is also provided with a longitudinal series of grain inlet openings or slots 24. By adjusting the sliding closures 23, the openings 21 and 24 will coact to regulate the flow of grain from the truck body into the hoppers, and complete unloading of the truck body may be readily effected by shoveling the grain onto the sliding closures 23 when necessary. The plates 20 are bolted to the hoppers and to the lower section of the casing 5, as at 25, and certain of the bolts at 25 may also be utilized to bolt the blower to the floor 18 of the truck body.

To facilitate adjustment of the sliding closures 23, operating rods or shafts 26 are journaled in an upright position at opposite sides of the outlet pipe 8, and these shafts 26 are provided near their lower ends with lateral arms 27 loosely engaged in openings of upstanding lugs 28 fixed to the sliding closures 23. As shown, a bearing 29 is provided for each shaft 26 near its upper end and the shaft is journaled at its lower end in the top flange of the lower section of the blower casing 5, the bearing 29 being mounted on the adjacent side of the outlet pipe 8. At its upper end, each shaft 26 has a lateral handle 30 to facilitate manual turning thereof. By turning the shafts 26, the sliding closures 23 may be moved longitudinally to close or to partially or wholly open the openings 21 of plates 20. It will be seen that a feed hopper is provided on each side of the blower so that rapid delivery of the grain to the blower is had, and expeditious unloading of grain may be accomplished without running the blower at excessively high speed.

In order that the blower may discharge the grain at the desired elevation and at the desired point beyond or to one side of the truck body, the outlet pipe 8 is provided with a suitable upward and lateral extension generally indicated by the numeral 31 in Figure 5. As shown, this extension includes a straight extensible pipe composed of adjustably telescoped sections 32 and 32a, the outer section 32 having a split clamping band 33 at its inner end to secure the sections in adjusted relation. The outer ends of the sections 32 and 32a have flanges to facilitate coupling of the same respectively to the flanged end of an elbow 34 and the flanged upper end of the outlet pipe 8. Grooved clamping bands 35 are provided to couple these flanged ends together so that the adjustable pipe and elbow may be rotatably adjusted relative to each other and the outlet pipe 8. Another straight pipe section 36 may be coupled to the upper horizontal arm of elbow 34 if desired, and it will be seen that the elbow 34 may be raised or lowered and turned about a vertical axis relative to outlet pipe 8 so as to discharge the grain at the desired elevation and to the desired point laterally of the truck body.

From the foregoing description, it will be seen that I have provided a grain blower which may be readily mounted in an opening provided in the bottom of the floor of a truck body so that the feed hoppers are disposed with the tops thereof substantially flush with the floor. In this way, the grain can be readily and effectively unloaded from the truck body, and the sliding closures 23 permit proper control of flow of grain into the feed hoppers. One end of the shaft 6 may be readily driven from the power take-off of the truck by the use of universal joints and shafting, one of which universal joints is removably secured on the end of shaft 6 and indicated at 37. In use, shaft 6 is suitably driven so that the grain supplied to and admitted from the feed hoppers to the blower casing will be mixed with the air supplied through the inlets 13, and the mixture of air and grain will be forcibly discharged upwardly through the outlet pipe 8 and its extension 31.

It is believed that the construction, operation and advantages of the present invention will be readily apparent to those skilled in the art, and minor changes may be made in details of construction such as fall within the spirit and scope of the invention as claimed.

What I claim is:

1. A twin feed grain unloading blower for trucks comprising a blower casing having side inlets and provided with an upwardly directed peripheral outlet pipe, a rotary impeller operable in the blower casing, grain feed hoppers formed on opposite sides of the blower casing and communicating at their bottoms with the side inlets of the blower casing, apertured cover plates for the tops of said hoppers, and sliding closure plates on said cover plates for regulating the flow of grain to the hoppers.

2. A twin feed grain unloading blower for trucks comprising a blower casing having side inlets and provided with an upwardly directed peripheral outlet pipe, a rotary impeller operable in the blower casing, grain feed hoppers formed on opposite sides of the blower casing and communicating at their bottoms with the side inlets of the blower casing, apertured cover plates for the tops of said hoppers, and sliding closure plates on said cover plates for regulating the flow of grain to the hoppers, said hoppers having air inlets in the outer sides thereof and near the bottoms of the same, and downwardly and inwardly inclined baffles arranged in the lower portions of the hoppers and overlying said air inlets.

3. In combination with the floor of a truck body or the like having an opening therein, a grain unloading blower fitted and secured in said opening and including a blower casing having side inlets and an upwardly directed peripheral outlet, and grain feed hoppers formed on opposite sides of the blower casing and having the tops thereof located substantially flush with said floor.

4. The construction defined in claim 3, wherein the blower casing is constructed of separable upper and lower sections, the feed hoppers being formed on the lower section of the blower casing, and said hoppers and said lower section of the blower casing having top flanges resting upon and secured to the floor in surrounding relation to said opening.

5. The construction defined in claim 3, wherein apertured closure plates are provided for the tops of the feed hoppers, said closure plates having side guideways, and manually adjustable closure plates slidably disposed on said cover plates and guided in said guides for regulating the flow of grain into the hoppers.

6. The construction defined in claim 3, wherein apertured closure plates are provided for the tops of the feed hoppers, said closure plates having side guideways, and manually adjustable closure plates slidably disposed on said cover plates and guided in said guides for regulating the flow of grain into the hoppers, and upright operating shafts journaled at opposite sides of the blower outlet pipe and operatively connected at their lower ends to the closure plates.

FERRIS E. MICHAEL.